United States Patent [19]
Shephard

[11] Patent Number: 4,616,423
[45] Date of Patent: Oct. 14, 1986

[54] TACTICAL DINGHY COMPASS

[75] Inventor: Kevin E. Shephard, Wollstonecraft, Australia

[73] Assignee: J. & K. Shephard Design Pty Limited, Miranda, Australia

[21] Appl. No.: 624,687

[22] PCT Filed: Oct. 21, 1983

[86] PCT No.: PCT/AU83/00149
§ 371 Date: Jun. 20, 1984
§ 102(e) Date: Jun. 20, 1984

[87] PCT Pub. No.: WO84/01623
PCT Pub. Date: Apr. 26, 1984

[30] Foreign Application Priority Data

Oct. 12, 1982 [AU] Australia ................. PF6301

[51] Int. Cl.⁴ ........................... G01C 17/02
[52] U.S. Cl. ........................... 33/355 R; 33/356; 116/DIG. 43
[58] Field of Search ............ 33/355 R, 355 D, 356, 33/319, 320, 352; 73/178 R; 116/19, 26, 335, DIG. 43

[56] References Cited

U.S. PATENT DOCUMENTS

| | | | |
|---|---|---|---|
| 86,694 | 3/1835 | Ball | 33/355 R |
| 1,720,964 | 7/1929 | Metcalf | 33/355 R |
| 3,824,947 | 7/1974 | Honkaranta et al. | 116/335 |
| 3,871,108 | 3/1975 | Beaudout | 33/355 R |
| 4,154,190 | 5/1979 | Utgoff | 116/DIG. 43 |

FOREIGN PATENT DOCUMENTS 1496 of 1861 United Kingdom ............ 33/355

*Primary Examiner*—Willis Little
*Attorney, Agent, or Firm*—Ladas & Parry

[57] ABSTRACT

A compass having a color coded compass card for enhanced reading of the compass. The compass card is divided into four quadrants each of which is further subdivided into equal sectors differently colored within each quadrant; the color sequence of the sectors within each quadrant is repeated in each quadrant. The color sequencing enables an efficient method of navigating a sailing dinghy around an olympic course.

6 Claims, 2 Drawing Figures

4,616,423

TACTICAL DINGHY COMPASS

TECHNICAL FIELD

This invention relates to an easy to read compass and a method of navigating a sailing dinghy.

BACKGROUND ART

The crew of a sailing dinghy normally have considerable difficulty in reading a tactical compass while sailing. This is because the compass is generally mounted centrally within the dinghy yet the crew are on the side of the dinghy and leaning outwardly, or may be suspended by a trapeze, to balance the dinghy and prevent it from capsizing. Under these circumstances a traditional compass marked with numbers or letters or both is extremely difficult, if not impossible, to read.

The crew of a sailing dinghy often must be preoccupied with positioning themselves so as to keep the dinghy upright so that a centrally mounted compass is simply visibly inaccessible. Even if the compass is mounted on the gunwhales of the dinghy, an outwardly leaning crew may not be able to read the numbers or letters on a compass card. These problems are particularly acute in single handed sailing craft such as Laser class dinghys or sail boards where the single crew has both his hands occupied in controlling the sheets and tiller and is often required to position himself well away from a compass.

Further, certain calculations require to be made during a sailing race, using a traditional compass. For example, determining the favoured end of the starting line, detecting wind shifts and calculating headings to the marks all require that the crew exercise mental arithmetic skills. The physical demands of dinghy sailing are such that it is extremely difficult to exercise the arithmetic skills needed to make these calculations. Again, these problems are particularly acute for single handed sailors in for example Laser class dinghys or sail boards.

Compasses having marked tacking angles on adjustable peripheral bezels have been used, however they still require the user to remember numbers and discern whether the numbers are increasing or decreasing as the compass swings, thus allowing the user to know if he is "lifting" or "knocking" on a particular tack.

DISCLOSURE OF THE INVENTION

This invention provides a compass which allows for ease of reading in a sailing dinghy and which also obviates the need for mental arithmetic in making the necessary calculations during a sailing race.

The invention provides a compass comprising a moveable compass card, said compass card being marked into quadrants, each quadrant being subdivided into a plurality of differently coloured equal sectors comprising a colour sequence said sequence being repeated in each quadrant.

The preferred method of reading the compass card is from above but this does not exclude any arrangement whereby the compass card can be read on edge or from below.

It is also preferred that the coloured sectors are marked at 10 degree intervals in an annulus around the circumference of the compass card.

Preferably the quadrants on the compass card are differently coloured and located separately from the coloured sectors in another annulus closer to the centre of the compass card.

It is also preferred that a plurality of coloured lubber lines are marked on the compass for ease of reading.

BRIEF DESCRIPTION OF DRAWINGS

By way of example only, the invention is described below with reference to the accompanying drawings wherein.

MODES FOR CARRYING OUT THE INVENTION

Figure 1:
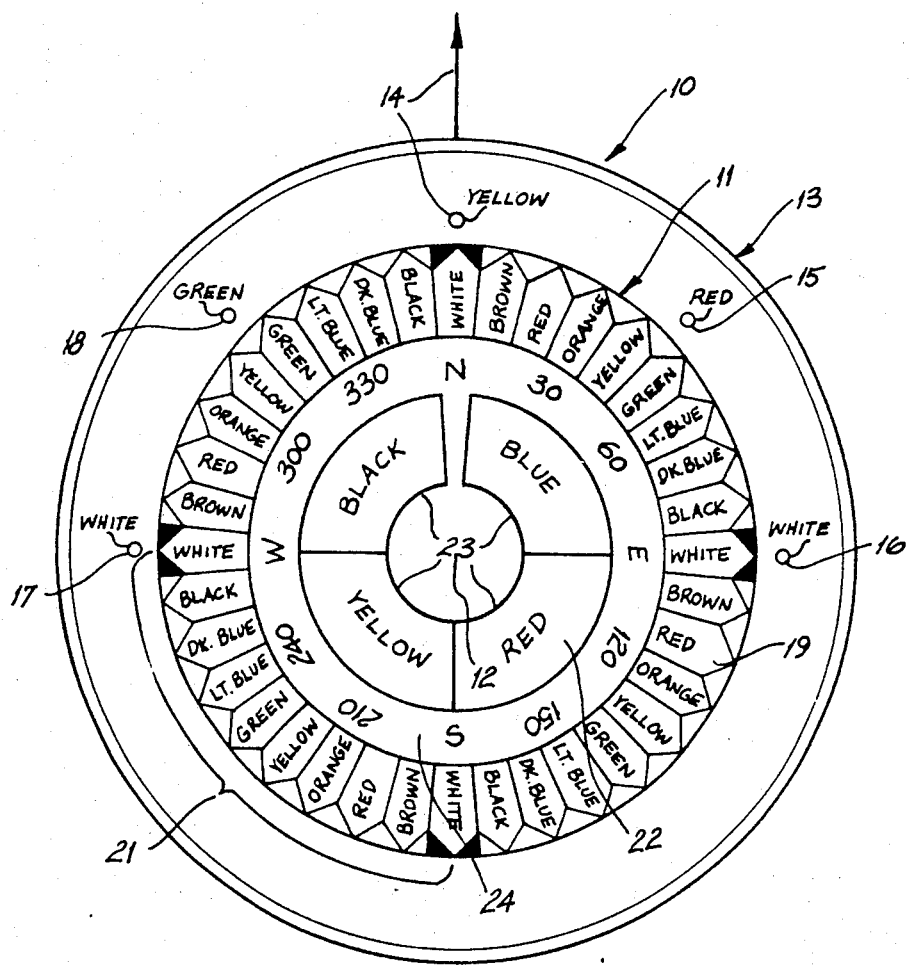
FIG. 1 is a schematic representation of a compass according to the present invention.

FIG. 1 shows a compass (10) compass card (11) mounted pivotally about substantially its centre point (12) in a non-magnetic housing (13) whereon a plurality of lubber lines (14)(15)(16)(17)(18) are marked. The compass (10) is mounted in a sailing craft with the lubber line (14), the "keel line" substantially parallel to the centreline of the sailing craft. The outer annulus (19) is divided into a plurality of coloured equal sectors. The colour sequence (21) within a quadrant is repeated in each of the quadrants. The inner annulus (22) is divided into four coloured quadrants (23).

Between the inner annulus (22) and the outer annulus (19) a middle annulus (24) is marked with the four cardinal points and a plurality of equally spaced bearings in degrees. The colour sequence (21) is designed to maximise the contrast between adjacent colours. Although the sequence exampled here achieves this purpose any suitable sequence may be used.

The colours of the quadrants (23) are also chosen for maximum contrast between adjacent quadrants.

Figure 2:
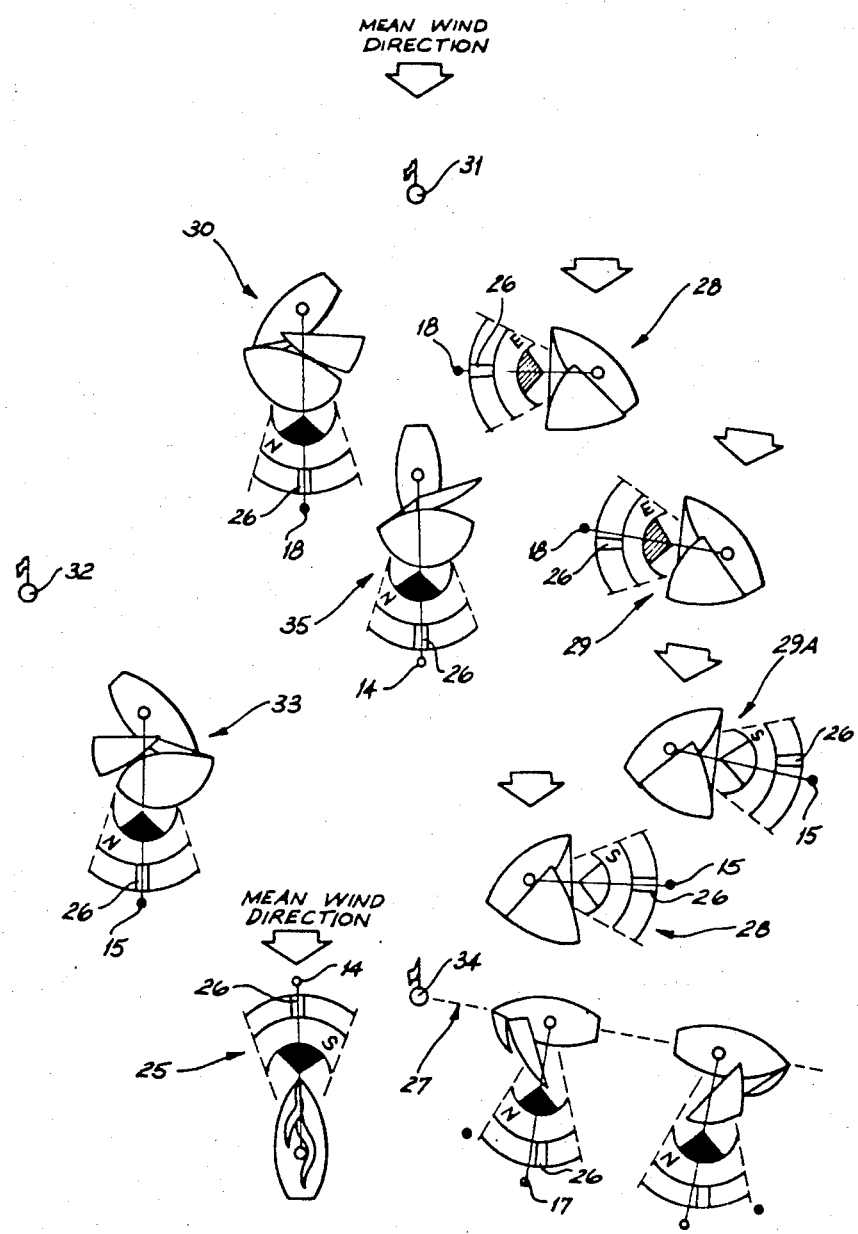
FIG. 2 is a schematic representation of a method of navigating an olympic course using the present invention.

FIG. 2 shows a method of using the invention in navigating an olympic course.

The boat is firstly pointed into the wind (25) and the crew note the colour of the sector (26) which is adjacent to the lubber line (14).

In order to determine the bias of the starting line, the boat is sailed along the starting line (27). If the starting line is square to the wind the colour (26) will be adjacent to the lubber lines (14) and (16) or (17). If the starting line is not square to the wind direction the favoured end is determined when the colour (26) is aft of the lubber lines (16) or (17).

When the boat is sailing into the wind it will tack through approximately 90°, each tack bearing approximately 45° off the mean wind direction. Therefore on a standard tack (28) the colour (26) will lie adjacent to either the lubber line (15), on a starboard tack, or lubber line (18) on a port tack.

A favourable wind shift on a tack (29) is indicated when the colour (26) moves aft of the lubber line (15) on a starboard tack, or the lubber line (18) on a port tack.

An unfavourable wind shift on a tack (29A) is indicated when the colour (26) moves forward of the lubber line (15) on a starboard tack, or the lubber line (18) on a port tack. The choice of contrasting colours in the annulus (19) enables these wind shifts to be easily detected.

On the starboard reaching leg (30), the wing mark (32) is found by bearing away 90° from the starboard tack on a port hand around course as the boat rounds the windward mark (31) to bring the colour (26) in the next quadrant adjacent to lubber line (18). The choice of contrasting colours in the annulus (22) enables the unambiguous associations of colour and quadrant to be quickly made by the crew.

On the port reaching leg (33) in a port hand around course, the start mark (34) is found by gybing the boat through 90° as it rounds the wing mark (32) to bring the colour (26) in the next quadrant adjacent to the lubber line (15).

Finally to set the course for the square run (35) back to the start mark (34), the colour (26) is brought adjacent to the lubber line (14).

On the downward legs to determine the "lifted" and "knocked" leg, for tacking downwind, the colour system may be used equally to advantage.

By using this method the crew can navigate an olympic sailing course without carrying out any arithmetic tasks. Navigation is performed simply by reference to a single colour relative to the appropriate lubber lines for the various legs.

I claim:

1. A compass comprising a moveable compass card, said compass card being marked into quadrant portions and having an annulus portion, each quadrant of the annulus being subdivided angularly into a plurality of equal sectors each colored differently from the other sectors in that quadrant said sectors forming a color sequence which is repeated in each quadrant of the annulus portion.

2. The compass as defined in claim 1 wherein said quadrant portions are differently colored and located on the said compass card separately from the said colored sectors of the annulus.

3. The compass as defined in claim 1 wherein said sectors are at 10 degree intervals.

4. A compass as claimed in claim 1, wherein said annulus portion is located along the periphery of said card.

5. A compass as claimed in claim 1, further comprising a plurality of lubber lines marked thereon at predetermined points.

6. A compass card for use in a compass, said compass card being circular and marked into quadrant portions and having an annulus portion, each quadrant of the annulus being subdivided angularly into a plurality of equal sectors each colored differently from the other sectors in that quadrant, said sectors forming a color sequence which is repeated in each quadrant of the annulus portion.

* * * * *

UNITED STATES PATENT AND TRADEMARK OFFICE
CERTIFICATE OF CORRECTION

PATENT NO. : 4,616,423

DATED : October 14, 1986

INVENTOR(S) : Kevin Edward Shephard

It is certified that error appears in the above-identified patent and that said Letters Patent is hereby corrected as shown below:

Title Page -

PCT Filed, Item [22]

delete "October 21, 1983" and replace therefor

--October 12, 1983--.

Signed and Sealed this

Twenty-ninth Day of December, 1987

Attest:

DONALD J. QUIGG

Attesting Officer  Commissioner of Patents and Trademarks